May 19, 1970    G. J. VIOLLET    3,512,875
ADJUSTABLE MAGNIFIER
Filed July 2, 1968

INVENTOR.
Gerard Viollet 3,512,875
ADJUSTABLE MAGNIFIER
Gerard J. Viollet, 1619½ W. 134th St.,
Gardena, Calif. 90249
Filed July 2, 1968, Ser. No. 750,397
Int. Cl. G02b 7/02
U.S. Cl. 350—243      1 Claim

ABSTRACT OF THE DISCLOSURE

An adjustable magnifier rotating around an axis and mounted on a Y shape resilient band which has V punch marks on its edges as to grip any shank or any ball of any size and any shape, said resilient band is for easily and simply allowing the adjustment of the lens position.

---

This invention relates to a magnifying lens holder adaptable on different implements, preferably on tools used in a machine shop; and an adjustable magnifying device to permit lines and centers, etc., to be located with great accuracy.

Important objects of the invention are:

(a) An adjustable magnifier which fits any shank and any ball of any size and any shape.

(b) A magnifier which can either fit: a scriber, or a trammel, or a surface gage, or a divider, or a center punch, or a wiggler, or a sticky pin, or a magnetic base, or a pencil, or a stencil knife, etc., or to be used by hand.

(c) The distance between the magnifier and the operator's eye can be precisely adjusted as required.

(d) Quick engaging and disengaging of magnifier holder from magnifier; and engaging or disengaging of magnifier holder from shanks without open end.

(e) A spring clamp which can be used for other purpose than holding a magnifier. Other and further objects and advantages of the invention will be apparent from the following description thereof and from the claim appended thereto.

In the drawings wherein like numerals refer to like or corresponding parts throughout the several views.

Figure 1:
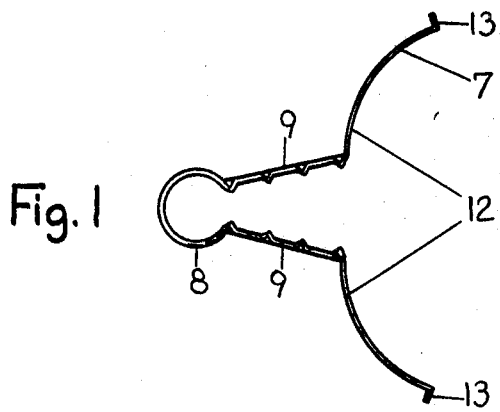
FIG. 1 is a top view of the magnifier holder.
Figure 2:
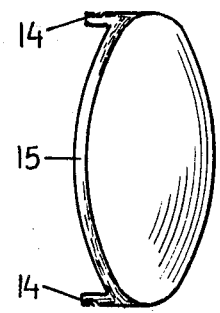
FIG. 2 is a perspective view of the magnifier.
Figure 3:
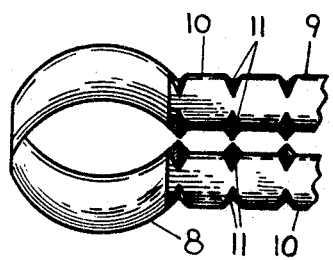
FIG. 3 is a perspective view of a portion of the magnifier holder.
Figure 4:
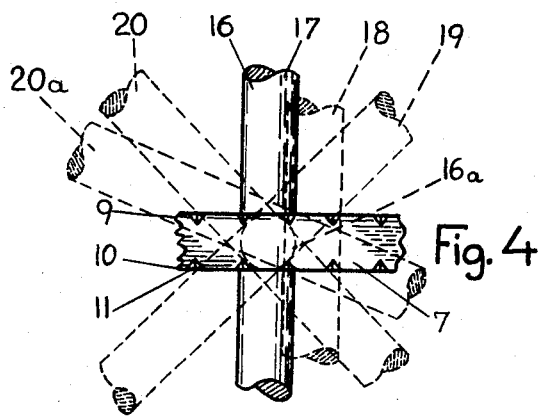
FIG. 4 is a side view of a portion of the magnifier holder.
Figure 5:
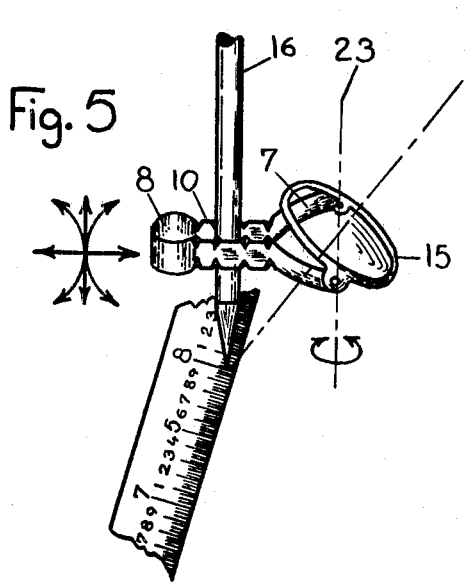
FIG. 5 is a perspective view of the assembly: magnifier and magnifier holder in position of use.
Figure 6:
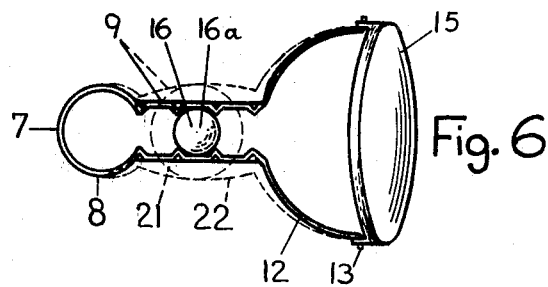
FIG. 6 is a top view of the magnifier and magnifier holder.

Referring to the drawings, the numeral 7 designates generally the magnifier holder made of a resilient band which has an approximate Y shape and having on one end a circular portion 8 which can fit a shank of almost same diameter, said circular portion 8 has on its both ends two strips 9 which carry on their edges 10 a plurality of V punch marks 11 equally spaced, said punch marks 11 form teeth which are oriented toward the inside of the magnifier holder, and said teeth are preferably in line to each other; said strips 9 are ended with two open arms 12 which have at their extreme end a bent tab 13 which enter holes 14 of a magnifier 15; a shank 16 which can be a tool or a wire, or a ball 16a, etc., is inserted between two strips 9 and marks 11 grips said shank 16 which can be set on any desired positions such as 17, 18, 19, 20, 20a, if shank 16 or ball 16a are of a bigger diameter 21, strips 9 open up in a position 22; said magnifier 15 can also rotate around its holes 14 axis 23; after proper adjustment of magnifier 15, operator's eye 24 can clearly see tools or objects, etc.; said magnifier holder 7 can have its tabs 13 connected to different objects other than magnifier.

While the foregoing has illustrated and described what is now contemplated to be the best mode of carrying out the invention, the construction is of course, subject to modification and improvement without departing from the spirit and scope of the invention. It is therefore, not desired to restrict the invention to the particular forms of construction illustrated described, but to cover all modifications that may fall within the scope of the appended claim.

Having thus described the invention, what is claimed as new is:

1. A magnifier holder comprising a resilient band having a Y shape defining two open ends and a closed end, each open end having open arms, a bent tab in each arm end, a round magnifier having an annular member, two diametrically disposed tabs on said member, each tab having an opening adapted to cooperate with each of the bent tabs to provide pivotal movement of the magnifier, the closed end of the band comprising two spaced strips, each strip having equally spaced V punch marks on both edges of the strips forming teeth which are oriented toward the inside of the holder, the closed end of the band terminating in a C-shaped portion adapted to grip a support shank.

References Cited

UNITED STATES PATENTS

| | | | |
|---|---|---|---|
| 1,557,605 | 10/1925 | Meara | 350—245 |
| 1,806,422 | 5/1931 | Shaen | 350—251 |
| 2,732,761 | 1/1956 | Bender et al. | 350—244 |

DAVID SCHONBERG, Primary Examiner

M. J. TOKAR, Assistant Examiner

U.S. Cl. X.R.

7—1; 24—73.7, 257; 248—124